J. Emerson,
Ship's Windlass,
No. 1,020, Reissued July 31, 1860.

N. PETERS, PHOTO-LITHOGRAPHER, WASHINGTON, D. C.

UNITED STATES PATENT OFFICE.

WILLIAM H. GILMORE, OF WORCESTER, MASSACHUSETTS, ASSIGNEE OF JAMES EMERSON.

IMPROVEMENT IN SHIPS' WINDLASSES.

Specification forming part of Letters Patent No. 12,718, dated April 17, 1855; Reissue No. 1,020, dated July 31, 1860.

*To all whom it may concern:*

Be it known that JAMES EMERSON, now or late of Worcester, in the State of Massachusetts, did invent an Improved Ship-Windlass, (on which Letters Patent No. 12,718 of the United States were granted to him on the 17th day of April, A. D. 1855,) and that the said EMERSON, by assignment duly recorded in the books of the United States Patent Office, has conveyed to me, WILLIAM L. GILMORE, of Worcester aforesaid, all the right, title, and interest he possessed in the said invention and Letters Patent; and whereas the said Letters Patent are believed by me to be inoperative and invalid by reason of a defective and insufficient description or specification and claim, I, the said GILMORE, do hereby declare the following to be, as I believe, a correct description of the said invention, reference being had to the accompanying drawings, of which—

Figure 1:
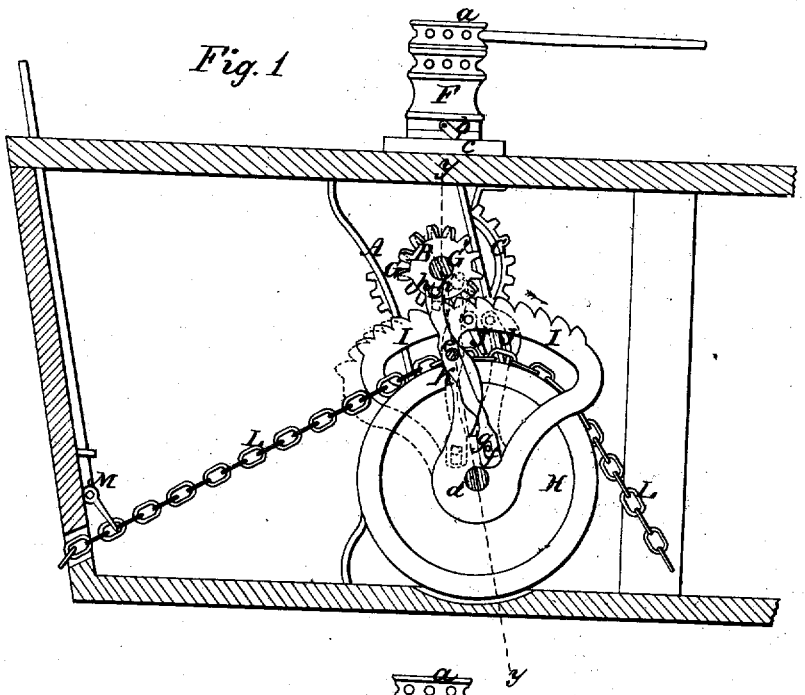
Figure 2:
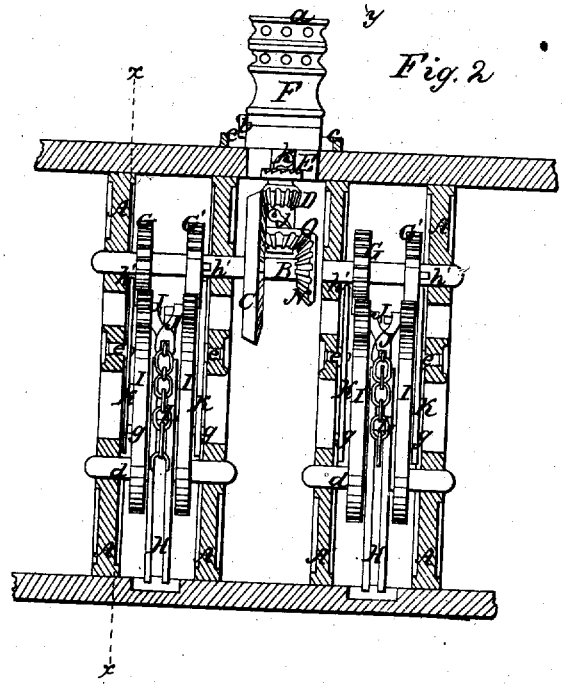

Figure 1 is a longitudinal section of my improved windlass, *x x*, Fig. 2, showing the plane of such section. Fig. 2 is a transverse section of it, *y y*, Fig. 1, showing the plane of such section.

Similar letters of reference indicate corresponding parts in the two figures.

The nature of my invention consists in a peculiar combination of mechanism for taking in an anchor-chain; also, in the combination and arrangement of certain accelerating mechanism with the driving and main shafts of the said combination (or its equivalent) for taking or drawing in an anchor-chain; also, in a peculiar arrangement of an auxiliary capstan with the main capstan and its shaft, when the latter is connected with and made to operate another shaft by gears, as hereinafter specified.

To enable others skilled in the art to make and use my invention, I will proceed to describe its construction and operation.

A represents a framing constructed in any proper manner to support the working parts. B represents the main horizontal shaft, which extends entirely across the framing, and is supported in suitable bearings upheld by the framing.

On the shaft B, at about its center, is affixed a bevel-toothed wheel, C, in which a bevel-pinion, D, gears, said pinion D being fixed on a vertical driving or capstan shaft, E, which revolves within a capstan, F, and at its upper end is provided with a cap, *a*, or is furnished with holes for the insertion of levers or capstan-bars. The lower part of the auxiliary capstan F has a pawl, *b*, attached to it, the lower end of which works over an annular rack, *c*, as usual with capstans. On each half of the shaft B there are hung two part pinions, G G′, a suitable distance or space being allowed between them. The toothed arc of each of these part pinions exceeds a semicircle, each having a few teeth over such, and they are placed reversed upon the shaft B, the smooth portion of one being opposite the toothed portion of the adjoining one.

H H are chain-supporting wheels or pulleys, the axes *d d* of which work in suitable bearings in the frame A. I I are geared sectors, which are fitted to their shaft *d* so as to turn loosely thereon, there being a sector at each side of each of the pulleys H H, as shown in Fig. 2. Each sector I is provided with a pawl, J, the pawl of one sector being at the end opposite to the end to which the pawl of the adjoining sector is attached, as shown clearly in Fig. 1. At the outer side of each sector I there is a lever, K. These levers work, respectively, on pivots or fulcra *e*, attached to the framing A. The lower ends of the levers are provided with slots *f*, pins *g*, projecting from the lower ends of the sectors, being made to enter the slots *f*, as shown clearly in Fig. 1. The upper ends of the levers K are forked, as shown at *h*, (see more particularly Fig. 1,) and receive pins *h′*, attached to the outer sides of the part pinions G G′. L L represent the anchor-chains, which pass over and rest on the periphery of the pulleys H H, one chain being over each pulley. M, Fig. 1, is a chain-stopper, there being one to each chain. These stoppers work or are placed over the hawser-holes, one of which is shown at *i* in Fig. 1. N is a small bevel-wheel carried by the shaft B. The wheel N gears into a corresponding-sized wheel, O, on the lower part of the shaft E. This wheel O is run loosely on the shaft E, and its upper edge is toothed or notched, so as to receive a pawl, *j*, which depends from the shaft E and catches into the notches when the shaft E is turned from left to right. The bevel-wheel D is also so supplied to the shaft E as to rest loosely on it while turned from left to right; but it moves or turns with said shaft from right to left, in consequence of a pawl, *k*, catching into a ratchet applied to the gear D. The pawl depends from the shaft E. (See Fig. 2.)

The operation is as follows: By turning the shaft E from right to left by means of levers placed in the capstan-head *a* the shaft B will be rotated in consequence of the wheel D gearing into the wheel C, and the part pinions G G′ will alternately gear into the sectors I I, and one sector will be moved backward or in the direction indicated by the arrow. (See Fig. 1.) Next the other sector will be moved. The pawls J of the sectors by such means will be caused to alternately catch against the chain L, and of course take it in or move it over the pulley H. The movement of each of the chains will be continuous, because the part pinions are rather more than half-pinions, and one catches its sector before the other pinion leaves its sector. After each of the part pinions leaves its sector the latter will be thrown forward (so as to be ready to be caught by the other part pinion) by means of its lever K, which will be operated by a pin, *h′*, taking into the fork *h*. The lower ends of the levers are thrown forward, and also the sectors, by means of the pins *g* acting in the slots *f*. The above windlass has two pulleys or chain-wheels, H H, operated precisely alike, so that two chains or cables may be drawn up. On reversing the motion of the shaft E the small gear-wheels N O will increase the speed of the parts. This auxiliary gearing is used when great power is not required. The chain-stoppers M M are employed for stopping the chains or cables and holding them while throwing up the pawls J, in order to drop the anchors.

The windlass does not monopolize much room. One or two chains may be operated by it, and it holds on muddy or icy chains as well as if they were dry and clean.

By means of the auxiliary capstan F, combined and arranged with respect to the capstan-shaft, its head *a*, and either the main or the main and auxiliary mechanism for taking in an anchor, as described, important advantages result, the capstan F serving to steady the shaft, also when requisite to assist in rapidly taking in the chains by means of a line. It can also be employed to advantage in case of breakage of a part of the mechanism.

What I claim as new, and desire to secure by Letters Patent, is—

1. The combination applied to each chain-wheel H and the shaft B, the same consisting of the part pinions G G′, the guard-sectors I I, the pawls J J, the levers K K, and the studs *h′ h′*, the whole being made to operate together and be operated by the shaft B, substantially in manner and for the purpose as specified.

2. The combination and arrangement of the gears C D N O and their ratchet and pawl mechanisms or equivalents therefor applied to the two shafts B E, substantially in manner and for the purposes as specified.

3. The arrangement of the auxiliary capstan F with the main capstan *a* and its shaft E, when the latter is connected with and made to operate another shaft, B, by gears C D, as described.

WM. H. GILMORE.

Witnesses:
JAMES P. ELLIS,
CHARLES A. BARNES.